March 25, 1952

M. N. FAIRBANK 2,590,164

VIEW FINDER CENTERING DEVICE
FOR PHOTOGRAPHIC APPARATUS

Filed Aug. 11, 1948

INVENTOR
Murry N. Fairbank
BY Donald L. Brown
and
Oliver H. Hayes
Attorneys

March 25, 1952

M. N. FAIRBANK 2,590,164

VIEW FINDER CENTERING DEVICE
FOR PHOTOGRAPHIC APPARATUS

Filed Aug. 11, 1948

INVENTOR
Merry N. Fairbank
BY Donald L. Brown
and Oliver F. Hayes
Attorneys

Patented Mar. 25, 1952

2,590,164

UNITED STATES PATENT OFFICE 2,590,164

VIEW FINDER CENTERING DEVICE FOR PHOTOGRAPHIC APPARATUS

Murry N. Fairbank, Belmont, Mass., assignor to Polaroid Corporation, Cambridge, Mass., a corporation of Delaware Application August 11, 1948, Serial No. 43,680

3 Claims. (Cl. 88—1.5)

This invention relates to photography and more particularly to novel view finders for use on hand-held cameras.

A principal object of the present invention is to provide an improved view finder of the direct sighting type having an improved construction which makes this view finder cheap and simple to manufacture.

Another object of the invention is to provide an improved view finder of the above type wherein a plurality of viewed-image-defining elements are provided and the various elements are so arranged as to permit the folding thereof into an inoperative position, the folding being effected in an extremely simple manner.

Still another object of the invention is to provide a folding view finder of the above type having two optical elements wherein the two elements thereof are brought into folded position by engaging only one of the two elements.

Still another object of the present invention is to provide a camera having a view finder of the above type and an improved means for centering a viewed scene and for correcting for parallax between the view finder and the lens system of the camera at close ranges of use of the camera.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following description taken in connection with the accompanying drawings wherein.

Figure 1:
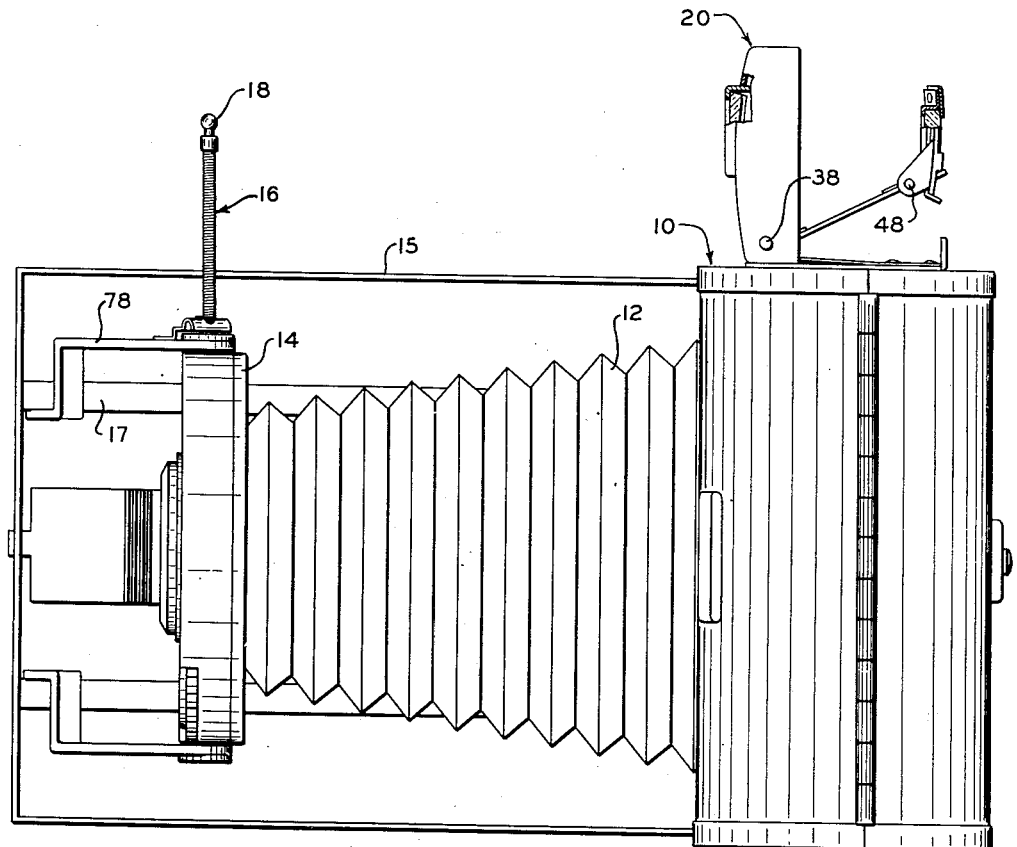
Figure 1 is a diagrammatic, exaggerated, partially sectional view showing the view finder and centering means of the present invention mounted on a hand-held camera.

In general this invention relates to direct sighting view finders of the type wherein a plurality of viewed-image-defining elements are arranged along a sighting axis. In a preferred form of the invention two optical elements are provided, these elements comprising frames or masks whose edges define a field of view and the sighting axis. In a preferred type of finder the optical elements provide a reversed Galilean telescope, one optical element including a rear lens having positive power and the other optical element including a front lens having negative power.

One feature of this invention is directed to the provision of improved means for mounting the two optical elements of the view finder on the camera so that they may be readily folded close to the camera, when not in use, to prevent damage thereto during handling of the camera. Another feature of the invention is the combination, with view finders of this type, of an improved means for centering the viewed image and for correcting for parallax of the view finder with respect to the camera lens.

In one preferred form of the invention there is provided a suitable holder for one of the lenses of the view finder, this holder preferably serving as a protective housing for the two lenses of the view finder when the view finder is in closed position. A suitable holder is also provided for the other lens and means are included for maintaining the two lens holders in spaced relation, when in their operative position, so that the axes of the two lenses are aligned. In a preferred form, means are provided for moving one of the lenses from a position where the axes of the two lenses are in alignment to a position where the second lens underlies the first lens with the holder for the latter lens constituting a housing for maintaining both lenses in a closed position. In this preferred type of arrangement, there is provided an operative connection between the holder for the first lens and the holder for the second lens so that, upon movement of the first lens holder to closed position, the second lens holder is folded into superposed relation beneath the first lens holder.

In the preferred form of the invention this operative connection includes a supporting arm for the second lens holder, this arm in turn being pivotally connected to the first lens holder. This supporting arm maintains the second lens in alignment with the first lens when the view finder is opened and is arranged to be pivoted, as a unit, with the first lens holder. As the view finder is closed, by pivoting the first lens holder, the supporting arm moves the second lens holder towards the camera body. Means, comprising a stud, is preferably associated with the means for securing the view finder to the camera body in position to be engaged by a portion of the second lens holder when the latter is moved towards the camera. Engagement of this stud causes a pivotal movement of the second lens holder which has a greater angular speed than the angular speed of pivotal movement of the first lens holder. This higher pivotal speed of the second lens holder continues long enough to permit a folding of the second lens holder underneath the first lens holder as the latter is brought to closed position. For maintaining the various elements of the view finder in operative relationship with each other, several spring elements are preferably provided. One of these springs maintains the supporting arm in proper relation to the first lens holder and another spring maintains the second lens holder in proper relation to the supporting arm. A third spring element maintains the first lens holder in either closed or open position.

Figure 1A:
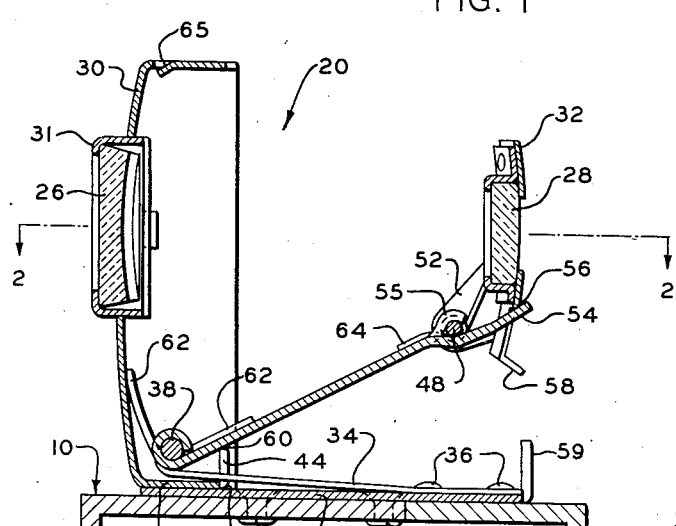
Fig. 1a is a diagrammatic, fragmentary, enlarged, sectional view of the view finder of Fig. 1, the section of Fig. 1 being taken along the line 1—1 of Fig. 2.
Figures 2, 3, 4:
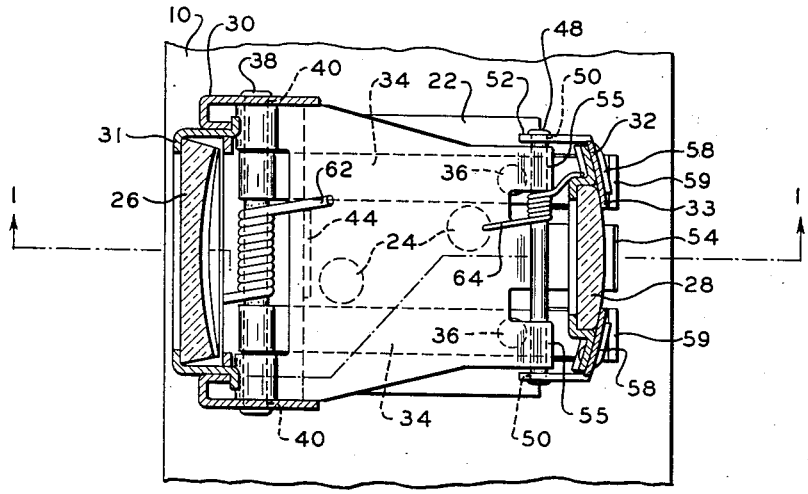
Fig. 2 is a diagrammatic, exaggerated, fragmentary, sectional view of Fig. 1a taken along the line 2—2.
Fig. 3 is a fragmentary, sectional view similar to Fig. 1a with the parts of the view finder moved to half-closed position.
Fig. 4 is an exaggerated, enlarged, sectional view of the centering means constituting a part of the invention.

Referring now to Figs. 1, 1a and 2, there is shown one preferred form of the invention as applied to a hand-held camera. In these figures, like numbers refer to like elements in each of the respective figures and 10 represents the camera body having the usual bellows 12 connected to a lens and shutter housing schematically indicated at 14. The shutter housing is preferably carried by a front door member 15 having a focusing track 17 thereon. Suitably mounted on the shutter housing 14 is a view finder centering device 16 comprising a relatively deformable element having a front sighting mark, comprising a ball 18, on the end thereof. The view finder is generally indicated at 20, being shown in the open position in Figs. 1 and 1a and in the half-closed position in Fig. 3. For securing the view finder 20 to the camera body, there is shown a securing means 22 comprising a base plate fastened, such as by means of rivets 24, to the camera body 10.

The front lens 26 of the view finder is preferably a negative power lens and the rear lens 28 is preferably a positive power lens. The front lens 26 is carried by a lens holder 30 and the rear lens 28 is carried by a second holder 32. A mask portion 31, of the front lens holder 30, and a mask portion 33, of rear lens holder 32, define the limits of the field viewed through the two lenses. A pair of spring elements 34, secured to base plate 22 by means such as rivets 36, are provided for mounting the front lens holder 30. At the free (left) end of the spring elements 34 there is held a pivot pin 38, pin 38 extending through journal holes 40 (Fig. 2) in the side walls of the front lens holder 30. A pair of planar bearing surfaces 42 and 44 are provided on the lower end of holder 30, surface 42 being substantially parallel to the lens axis and surface 44 being substantially normal to this lens axis. A corner joining these two bearing surfaces is indicated at 43.

Also preferably carried by the pivot pin 38 is a supporting arm 46 which maintains the rear lens holder 32 in operative relation to the other lens holder. Near the outer end of arm 46 there is provided a second pivot pin 48 secured to arm 46 such as by means of one finger 54 extending under pin 48 and two fingers 55 passing over pin 48. Pivot pin 48 extends through a pair of journal holes 50 (Fig. 2) in a pair of side walls 52 associated with the rear lens holder 32. The outer end of finger 54, carried by the end of supporting arm 46, serves as a lug which is adapted to bear on a bottom portion 56 of the rear lens holder 32. For rotating rear lens holder 32 in a counterclockwise direction around pivot pin 48, there is provided a pair of downwardly extending skirts 58 which are adapted to engage a pair of studs 59, preferably constituting a part of base plate 22, when the arm 46 is lowered.

For normally urging the arm 46 in a clockwise direction around pivot pin 38, and into engagement with a top portion 60 of the planar surface member 44, there is provided a coil torsion spring 62. This coil spring 62 is coiled around pin 38, one end bearing on arm 46 and the other end bearing on holder 30 and tending to maintain arm 46 in the position shown in Fig. 1. For normally rotating rear lens holder 32 in a clockwise direction around pivot pin 48, until portion 56 of the holder 32 engages the lug portion of finger 54, there is provided a second torsion spring 64. Spring 64 is preferably coiled around pin 48, one end bearing on arm 46 and the other end bearing on holder 32. These two springs 62 and 64, in addition to springs 34, maintain the elements in the position shown at Fig. 1.

In the closing operation of the view finder shown in Figs. 1 through 3, the front lens holder 30 is pushed in a clockwise direction around pivot pin 38. As the lens holder 30 commences to rotate, pivot pin 38 is moved upwardly due to the fact that the corner 43 bears on the base plate 22. At the same time, the top 60 of the surface-defining member 44 also drops. The raising of the pivot pin 38 and the dropping of portion 60 allows the spring 62 to rotate arm 46 rapidly towards the camera body 10. As arm 46 rotates downwardly, the downwardly extending skirts 58, on the rear lens holder 32, engage the studs 59, thus rapidly rotating rear lens holder 32 in a counterclockwise direction around pivot pin 48 against the force of coil spring 64. This movement of the various elements of the view finder is shown most clearly in Fig. 3 wherein the rear lens holder 32 has begun to rotate around its pivot point 48. Continued rotation of the elements past the position shown in Fig. 3 causes the lens holder 32 to rotate completely under the lens holder 30, lens holder 30 engaging lens holder 32 in the latter part of the travel and maintaining lens holder 32 in its folded condition. During the latter portion of the travel of lens holder 30 down into its closed position, bearing surface 44 has been brought into engagement with the base plate 22. When surface 44 is flat against plate 22, the spring elements 34 maintain lens holder 30 tightly in place, spring elements 34 being strong enough to resist the opening forces of springs 62 and 64.

When it is desired to open the view finder from the closed position, the camera user inserts a fingernail into a slot 65, provided in the end of the lens holder 30, to lift the lens holder into the vertical position. As a result of the movement of lens holder 30, the spring 62 and spring 64 tend to rotate both the arm 46 and the rear lens holder 32 in a clockwise direction, the clockwise movement of holder 32 being prevented until the skirts 58 are clear of the studs 59. As the front lens holder 30 swings into the position shown, the top portion 60, of surface-defining member 44, lifts arm 46 to move it to the position shown in Fig. 1a. Meanwhile, rear lens holder 32 has been rotated clockwise until the portion 56 thereof engages the finger 54 carried on the end of the arm 46. When the elements of the view finder have been moved into the position shown in Fig. 1, the planar surface 42 is bearing on the base plate 22 and the various parts of the view finder are held against rigid stops by the springs 34, 62 and 64 respectively.

The preferred centering means, mentioned previously, generally comprises the supporting column 16 having a front sighting mark, shown as the ball 18, on the outer end thereof. The axis of the supporting column 16 is preferably coplanar with the view finder axis and the camera lens axis. It supports the ball 18 sufficiently far in front of the view finder so as to allow this ball to be sharply in focus to an observer looking through the view finder, the ball indicating the center of the viewed image. As shown most clearly in Fig. 4, the centering means 16 is so made as to be relatively easily deformable in any direction throughout substantially its whole length. This centering means is preferably formed of a tightly coiled closely wound helical spring 70. This spring is preferably so tightly wound that it has the highest possible initial tension. Thus the coils of the spring tend to squeeze themselves together so that the spring element 70 normally extends in a straight line, as shown, but may be easily deformed by external forces. Spring element 70 is mounted on a threaded stud 72, stud 72 being secured to a partially cylindrical rod 74. Rod 74 is secured, by means of a spring clamp 76, to one of the arms 78 which hold the shutter housing 14 in upright position. It should be noted that a flat portion 75 on the rod 74 preferably bears against a stud securing the arm 78 to the housing 14, thereby holding the centering means in a position normal to arm 78. The resilience of clamp 76 permits rotation of rod 74 around its axis so that the centering means 16 may be folded along arm 78 when desired. On the outer end of this spring element 70 there is provided a second stud 80 carrying the ball 18 on the extremity thereof. Spaced inwardly on the ball 18, and also carried by the stud 80, is a collar 82.

In a preferred form of arrangement of the above elements of the invention, the view finder axis is substantially parallel to the camera lens axis. The centering ball 18, carried by the centering means 16, is spaced slightly inwardly of the view finder axis towards the camera lens axis, thereby centering the view finder image for objects which are photographed at a distance of about 40 feet from the camera. This ball 18 is used for objects down to about 8 feet. For objects less than about 8 feet from the camera, the camera user centers the view finder image by means of collar 82, thereby approximately correcting for parallax due to the shorter distance of focus. While the centering indicia are shown in the form of a ball and collar, numerous other combinations of indicia may be employed and a plurality of collars can be used where absolute accuracy is required. In those cases where it is desired not to use the centering means 16, it can be folded down along the arm 78 where it will be completely out of the field of view of the view finder.

When the camera is folded, the shutter housing 14 is moved into the camera body 10 and the centering means 16, which may be extending outwardly in the position shown in Figs. 1 and 4, engages the edges of that portion of the camera body adapted to receive the bellows and the shutter housing. Due to the ability of the coil spring 70 to be deformed in all directions, through substantially its whole length, the centering means is drawn into the camera body with no difficulty, bending around any obstruction encountered. The camera cover 15 is then closed, it being unnecessary to touch the view finder centering means 16 during the closing of the camera. When the camera is opened, as soon as the shutter housing 14 is free from the camera body, the coil spring 70 may be grasped so as to move the stud 72 to the vertical position in Fig. 4. In those cases where the hinged connection 74, 76 is omitted, the resilience of the coil spring 70 allows this coil spring to immediately straighten itself out to the position shown. Aonther advantage residing in the flexibility of the coil spring, forming the supporting column 16, is its freedom from the possibility of damage due to catching on the user's clothes or the like. If this should happen, the supporting column 16 readily bends and then straightens itself out as soon as it is disentangled.

While a preferred form of view finder has been shown in Figs. 1 through 3 above, numerous modifications thereof can be made within the scope of the invention. For example, the position of the lens holders can be reversed so that lens holder 30 is at the rear of the camera instead of at the front as shown. In this case lens holder 30 would carry the positive lens 28 and lens holder 32 would be at the front of the camera, holding negative lens 26. Equally, numerous modifications may be made in the specific form and shapes of the stampings and other parts from which the view finder is formed. For example, the securing plate 22 may be eliminated, in which case the rivets 36 may hold the spring elements 34 directly on the camera body. With such a modification, the bearing surfaces 42 and 44, associated with lens holder 30, will bear directly on the camera body and the cam stud 59 may be a part of the camera body 10 or may be a separate stud suitably secured thereto. Equally, leaf springs or other types of springs can be substituted for the helical springs 62 and 64, and other types of hinges, supports, and stop lugs may be employed without departing from the scope of the invention.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A view finder centering device adapted to be mounted on a camera having an eye level view finder and to be observed through said view finder when sighting on an object to be photographed, said centering device comprising a resilient columnar member which normally extends in a straight line and which is substantially universally bendable from its straight condition upon the application of a deforming force thereto but which, due to its resiliency, is returnable to said straight condition upon the removal of said force, said columnar member being formed of a tightly coiled helical spring having a high initial tension, hinge means connected to one end of said columnar member and pivotally securing said centering device to said camera, the end of said columnar member away from said hinge means being unsupported and free, and at least one sighting member carried by said columnar member adjacent said free end of the columnar member, said sighting member providing means for locating the center of the field of view observed through said view finder.

2. A view finder centering device as defined in claim 1 wherein said columnar member has one sighting member adjacent the free end of the columnar member and at least a second sighting member carried by the columnar member at a location adjacent said first sighting member and between the first sighting member and said hinge means.

3. A view finder centering device as defined in claim 2 wherein said hinge means comprises a rotatably mounted member to which said columnar member is fixed and includes means which assist in holding said columnar member against accidental displacement from an operative position to an inoperative position.

MURRY N. FAIRBANK.

REFERENCES CITED

The following references are of record in the file of this patent:

UNITED STATES PATENTS

| Number | Name | Date |
|---|---|---|
| 613,430 | Springsteen | Nov. 1, 1898 |
| 989,240 | Folmer | Apr. 11, 1911 |
| 1,060,636 | Ruttan et al. | May 6, 1913 |
| 1,178,475 | Becker | Apr. 4, 1916 |
| 1,261,643 | Stout | Apr. 2, 1918 |
| 1,933,784 | Wittel | Nov. 7, 1933 |
| 2,043,900 | Mihalyi | June 9, 1936 |
| 2,123,494 | Bernack | July 12, 1938 |
| 2,157,547 | Leitz | May 9, 1939 |
| 2,211,995 | Walker | Aug. 20, 1940 |

FOREIGN PATENTS

| Number | Country | Date |
|---|---|---|
| 10,740 | Great Britain | Of 1910 |
| 11,147 | Great Britain | Of 1911 |
| 275,071 | Germany | June 6, 1914 |